F. HARA.
ICE CREAM DELIVERY MACHINE.
APPLICATION FILED OCT. 29, 1918.
1,351,903.
Patented Sept. 7, 1920.
2 SHEETS—SHEET 1.
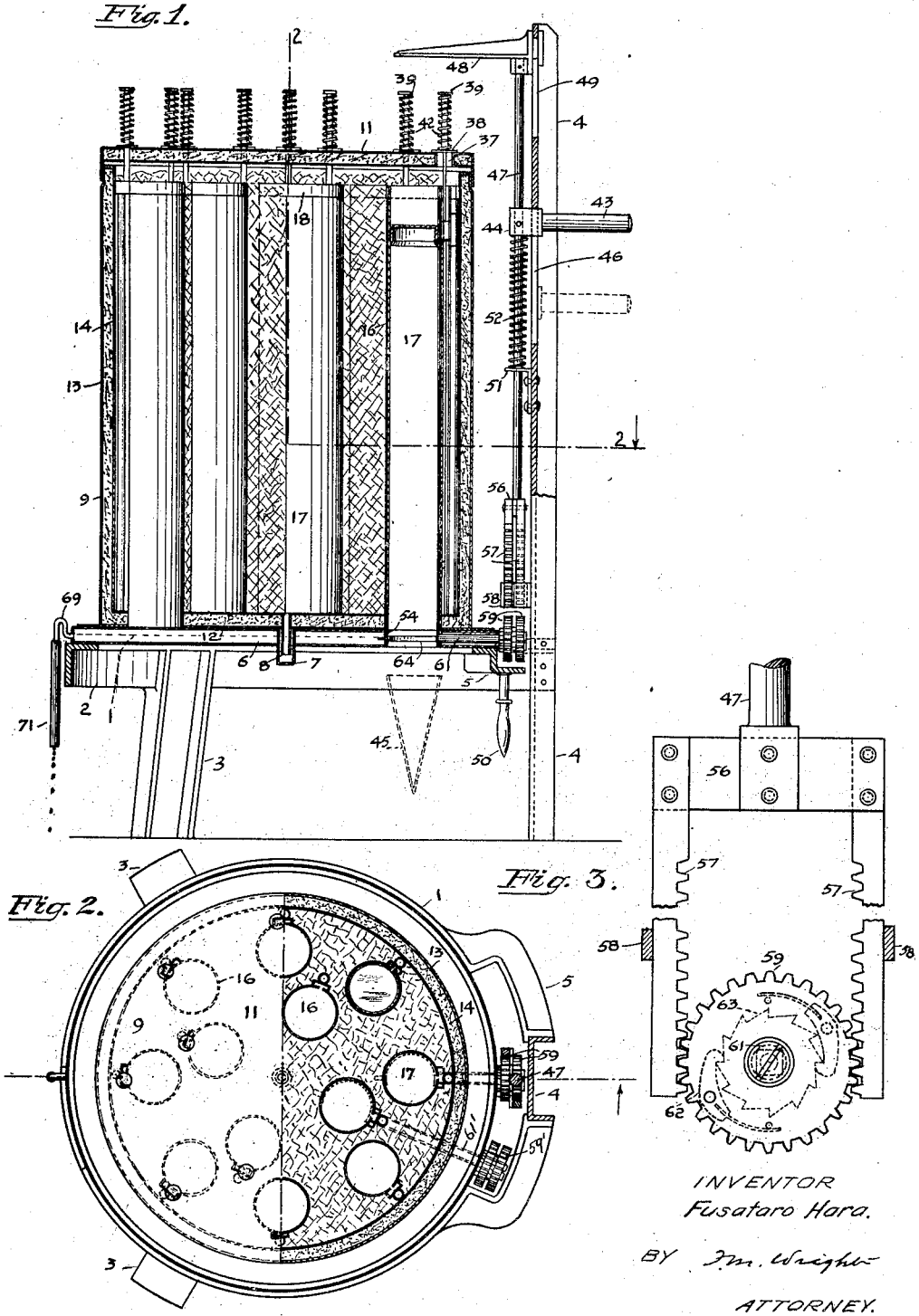
INVENTOR
Fusataro Hara.
BY *Wright*
ATTORNEY.

F. HARA.
ICE CREAM DELIVERY MACHINE.
APPLICATION FILED OCT. 29, 1918.
1,351,903.
Patented Sept. 7, 1920.
2 SHEETS—SHEET 2.
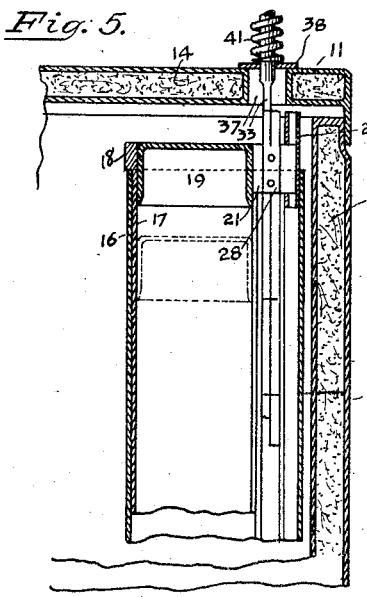
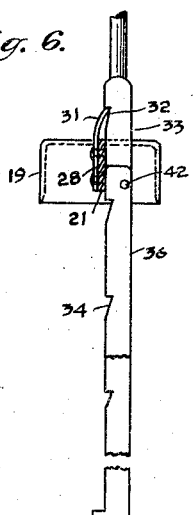
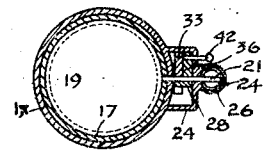
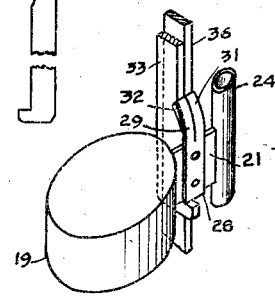
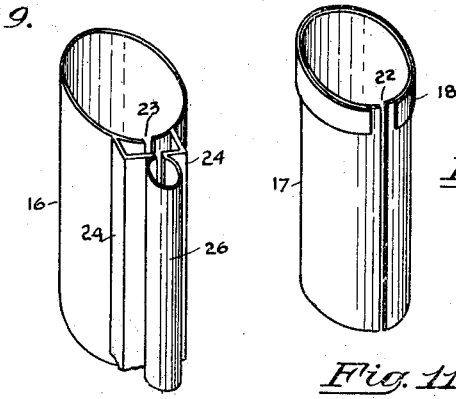
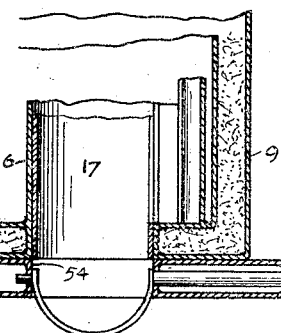
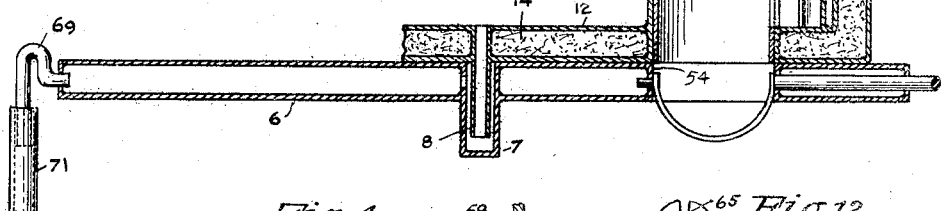
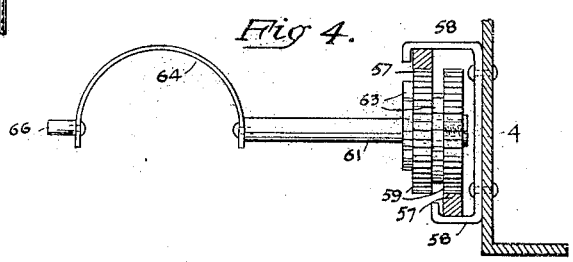
INVENTOR
Fusataro Hara.
BY
ATTORNEY

UNITED STATES PATENT OFFICE.

FUSATARO HARA, OF SAN FRANCISCO, CALIFORNIA.

ICE-CREAM-DELIVERY MACHINE.

1,351,903.  Specification of Letters Patent.  Patented Sept. 7, 1920.

Application filed October 29, 1918. Serial No. 260,196.

*To all whom it may concern:*

Be it known that I, FUSATARO HARA, a subject of the Emperor of Japan, residing at San Francisco, in the county of San Francisco and State of California, have invented new and useful Improvements in Ice-Cream-Delivery Machines, of which the following is a specification.

The present invention relates to improvements in ice cream delivery machines, the object of the invention being to provide a machine of this character in which a considerable quantity of ice cream can be contained in a cold condition ready for sale, and in which uniform quantities of ice cream can be easily and expeditiously discharged therefrom into any desired receptacle such as an edible ice cream cone.

In the accompanying drawing, Figure 1 is a verticle central section of my improved ice cream delivery machine; Fig. 2 is a horizontal section thereof on the line 2—2 of Fig. 1; Fig. 3 is an enlarged broken side view of a portion of the apparatus, certain parts being shown in vertical section; Fig. 4 is an enlarged plan view of a detail of the apparatus, certain parts being shown in horizontal section; Fig. 5 is an enlarged vertical section of a portion of the apparatus, certain parts being broken away; Fig. 6 is a side view of a follower and parts immediately related thereto, certain parts being shown in vertical section; Fig. 7 is a horizontal section of a tubular container for the ice cream, a follower therein being shown in plan view, and other elements being shown in horizontal section; Fig. 8 is a broken perspective view of said follower and parts immediately related thereto; Fig. 9 is a broken perspective view of a stationary tubular container; Fig. 10 is a broken perspective view of an ice cream tube; Fig. 11 is an enlarged vertical section of a water receptacle, and part of a delivery tank supported thereon; Fig. 12 is a plan view of a disk.

Referring to the drawing, 1 indicates a round ring or table having a low circular wall 2, and two short legs 3, said table being extended, as shown at 5, first radially and then circumferentially, and connected to a standard 4, the lower portion of which forms a third leg supporting said table.

Seated within said wall 2 is a shallow cylindrical water tank 6, having at its center a depending tube 7 open at the top and closed at the bottom. Into said tube 7 extends a water drip tube 8, depending centrally from a cylindrical ice cream tank 9, closed at the top by a cover 11. Said cover 11 and the bottom 12 and the cylindrical wall 13 of said tank 9 are double, and in the closed spaces thus provided is contained asbestos 14, so that but little heat can escape from the interior of the tank 9. In said tank 9 are fixedly secured outer and inner circular series of vertically arranged ice cream tube containers 16, said containers extending through the double bottom 12 and opening in the bottom of the tank. In each ice cream tube container 16 fits snugly a removable ice cream tube 17, having secured around its top a circular strip 18 which rests upon the top of the container 16 in which the tube is contained. The ice cream tubes 17, when filled with ice cream, are placed in the respective containers 16. The upper end of each ice cream tube is closed by a hollow cylindrical follower 19, having a closed top, and connected to a flat lateral extension 21 extending through, first, a vertical slit 22 in the ice cream tube 17 and then a vertical slit 23 in the tube container 16, the outer end of said extension being connected to the side of a short cylindrical guide 24, which slides in a cylindrical guideway 26 connected to walls 24, which are connected to the outer side of the tube container 16 on opposite sides of the slit 23 therein. To said extension 21 is secured a spring metal piece 28, which at its upper end is slit vertically and is bent over said extension to form two spring dogs 29, 31, which are adapted to engage, the dog 29 with notches 32 in a vertical edge of a pusher rod 33, and the dog 31 with notches 34 in a vertical edge of a retainer rod 36. The upper portion of the pusher rod 33 is rounded and extends first through a wide opening 37 in the cover 11 and then through a closely fitting opening in a disk 38 resting upon said cover and closing said wide opening. The round upper portion of each pusher rod 33 is provided at the top with a head 39, and between said head and the disk 38 is compressed a spring 41 coiled around said pusher rod. The retainer rod 36 is secured by a removable pin 42 to one of the walls 24.

43 indicates an operating handle, extending horizontally from the slide piece 44 which slides in a vertically extending slot 46 in an upper portion of the standard 4, and secured to an inner portion of said slide piece is a slide rod 47 from the upper end of which a finger 48, guided vertically in a slot 49 in said standard 4 extends from said standard 4 over said ice cream tank 9 and immediately over the head 39 of one of the pusher rods 33. Said slide rod 47 slides through a hole in a bracket 51 secured to the standard 4, and between said bracket 51 and the slide piece 44 is a spring 52 coiled around said rod 47, whereby said slide rod is restored to its normal position after it has been depressed by the handle 43. Upon depressing the handle 43, the finger 48 descends upon the head of the pusher rod 33 and depresses it, compressing the spring 41, so that the pusher rod 33 descends, and since one of its notches 32 is in engagement with the upper end of the spring dog 29, the dog 29 also descends, carrying with it the follower 19, and causing all the ice cream in the ice cream tube to descend through a distance corresponding to the distance between the notches 32. The tube container 16 containing the ice cream tube 17 in which is the ice cream thus depressed is immediately over a hole formed by a cylindrical wall 54 extending vertically through the shallow water tank 6, so that the ice cream is projected through said hole. The ice cream vender has in the meantime been holding an edible cone indicated at 45, or other receptacle immediately beneath said hole, so that the ice cream thus projected is discharged into said cone.

The ice cream thus discharged is cut off from the remainder of the ice cream in the ice cream tube 17 in the following manner. To the lower end of the slide rod 47 is secured a yoke 56, to the ends of which on opposite sides thereof are secured the upper ends of racks 57, guided by brackets 58 secured to the standard 4, which racks 57 engage opposite sides of gear wheels 59 loose on a shaft 61, which wheels 59 carry pivoted thereto spring-actuated dogs 62, which can engage ratchet wheels 63 secured to said shaft 61. By this arrangement the ratchet wheels 63 and shaft 61 are rotated by any vertical movement, either upward or downward, of the pusher rod 47. The shaft 61 is secured at its inner end to an end of a semi-circular cutter 64, of which the other end is secured to a short shaft 66, said shafts 61 and 66 having their bearings in opposite sides of the wall 54 which forms the cylindrical passage through the water tank 6, through which opening the ice cream is discharged. It thus follows that, after the finger 48 has descended a sufficient distance to project a sufficient quantity of ice cream through the passage through the water tank, the shaft 61 is rotated, and thus the portion of ice cream projected from the tube 17 is severed from the remainder thereof and is rounded at the top.

When pressure is removed from the handle 43, the rod 47 immediately rises under the action of the spring 52, thereby removing the pressure from the pusher rod 33 which then rises under the pressure of the spring 41. The follower 19 is prevented from rising with the pusher rod by the engagement of the dog 31 with one of the notches 34 in the fixed retainer rod 36.

When all of the portions of ice cream in one ice cream tube 17 have been discharged therefrom, the ice cream tank is rotated through a sufficient distance to bring the next ice cream tube 17 of the same series into a position in which the head of its pusher rod 33 can be engaged by the finger 48, and the operation heretofore described is then repeated to discharge the ice cream from said tube in uniform quantities.

When one circular series of ice cream tubes has thus been emptied of ice cream, the cold water tank is then rotated upon the table, by a handle 50 through a sufficient angle to bring a second pair of gear wheels 59' into the same position as the first pair of gear wheels 59, so that they can be engaged by said racks 57, in the same manner as before. It is for the purpose of permitting this substitution to take place, and the gear wheels 59 to be moved out of the way when not required, that the extensions 5 are provided. The shaft 61' rotated by said gear wheels 59' is of different length from the shaft 61, since the circular series of ice cream tubes now to be discharged of ice cream are at a different distance from the center of the tank 9 from that of the series already emptied. The finger 48 is sufficiently long to engage either the heads 39 of the first series or the heads 39' of the second series.

The operation of discharging the ice cream is now repeated upon the second series of tubes.

When the tubes of both series are empty, the disks 38 are withdrawn from the pusher rods 33, this being rendered possible by said disks having slots 65 of width not less than said rods 33 extending from the center to the circumference of the cover; 11 is then raised. The pins 42 are then withdrawn, so that the retainer rods 36 can be removed. This allows the followers 19, carrying the spring dogs 29, 31, to be raised entirely out of the tubes 17, and then said tubes can be removed from the tube containers 16. The projection at the lower end of the rod 36 engaging the extension 21 makes possible the removal of the plunger 19.

The space in the tank 9 between the ice cream tube containers 16 is filled with broken ice. The melting of this ice takes place slowly on account of the tank having a double wall, top, and bottom, in which is inclosed asbestos, but the water which is formed by the melting of the ice drips through the tube 8 into the cold water tank 6, (which thus serves as an additional heat insulating medium), and escapes through a stationary pipe 69 connected with a side of said cold water tank 6, and preferably extending first upward and then downward to form a water seal to prevent any air being admitted into said tank which would raise its temperature. Said pipe 69 is connected with a flexible pipe 71 which conducts the escaping water to any suitable receptacle.

It should be noted that, when the follower is placed in position, the air therein is trapped and, when the follower is depressed, forms a cushion preventing actual contact of the central portion of the follower with the ice cream.

I claim:

1. In an ice cream delivery machine, a tube container open at top and bottom, an open-bottomed tube removably contained within said container, side of the tube and container having registering vertical slots, means extending through said slots, for depressing ice cream in said tube, a spring for returning said means to its normal position after each operation thereof, and means supported adjacent to the bottom of said tube for severing from the remainder the ice cream projected through said bottom.

2. In an ice cream delivery machine, the combination of a rotatable vessel, vertical ice cream containers arranged in a concentric circular series in said vessel, each opening through the bottom of the said vessel, a follower in each container having a lateral extension, and means for depressing the extension and follower, of each of said containers in succession.

3. In an ice cream delivery machine, the combination of a rotatable vessel, vertical ice cream containers arranged in a concentric circular series in said vessel, each opening through the bottom of the said vessel, a follower in each container having a lateral extension, and means for repeatedly depressing through a uniform distance the extension and follower of each of said containers in succession.

4. In an ice cream delivery machine, the combination of a water tank, a vessel rotatably supported thereon, ice cream containers in said vessel and opening through its bottom, a tube open at top and bottom and depending from the bottom of said vessel to conduct into said tank water melted from ice in said vessel, and a closure for closing the top of said vessel.

5. In an ice cream delivery machine, the combination of a water tank, a vessel rotatably supported thereon, ice cream containers in said vessel and opening through its bottom, a tube open at top and bottom and depending from the bottom of said vessel to conduct into said tank water melted from ice in said vessel, means, forming a water seal, for conducting the water from said water tank, and a closure for closing the top of said vessel.

6. In an ice cream delivery machine, the combination of a water tank, a vessel rotatably supported thereon, inner and outer concentric circular series of ice cream containers in said vessel and opening through its bottom, a tube open at top and bottom and depending from the bottom of said vessel to conduct into said tank water melted from ice in said vessel, and means on which said water tank is rotatably supported.

FUSATARO HARA.